(12) United States Patent
Ukai et al.

(10) Patent No.: US 8,415,581 B2
(45) Date of Patent: Apr. 9, 2013

(54) POWER SOURCE CONTROLLER OF ELECTRICAL DISCHARGE MACHINE

(75) Inventors: Hiroshi Ukai, Tokyo (JP); Kazunari Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/866,422

(22) PCT Filed: Feb. 6, 2008

(86) PCT No.: PCT/JP2008/051972
§ 371 (c)(1),
(2), (4) Date: Aug. 16, 2010

(87) PCT Pub. No.: WO2009/098764
PCT Pub. Date: Aug. 13, 2009

(65) Prior Publication Data
US 2010/0320173 A1    Dec. 23, 2010

(51) Int. Cl.
*B23H 1/02* (2006.01)
(52) U.S. Cl.
USPC .................................. 219/69.13; 219/69.18
(58) Field of Classification Search ............... 219/69.13, 219/69.1, 69.12, 69.18; 700/162; *B23H 7/14, B23H 1/02*
See application file for complete search history.

(56) References Cited

U.S. PATENT DOCUMENTS

| 4,236,057 A | 11/1980 | Inoue |
| 4,376,880 A | 3/1983 | Inoue |
| 5,496,984 A | 3/1996 | Goto et al. |
| 5,751,155 A | 5/1998 | Akamatsu |
| 6,208,150 B1 | 3/2001 | Akamatsu |
| 6,469,522 B2 * | 10/2002 | Akamatsu ...................... 324/678 |
| 8,134,096 B2 * | 3/2012 | Ukai et al. ................. 219/69.13 |
| 2001/0002104 A1 | 5/2001 | Akamatsu |
| 2001/0003425 A1 * | 6/2001 | Akamatsu ..................... 324/678 |

FOREIGN PATENT DOCUMENTS

| JP | 50-000500 A | 1/1975 |
| JP | 53-107795 A | 9/1978 |
| JP | 53-110194 A | 9/1978 |
| JP | 61-159326 A | 7/1986 |
| JP | 05-293714 A | 11/1993 |
| JP | 08-108321 A | 4/1996 |

* cited by examiner

*Primary Examiner* — Kimberly Rizkallah
*Assistant Examiner* — Duy T Nguyen
(74) *Attorney, Agent, or Firm* — Sughrue Mion, PLLC

(57) ABSTRACT

A discharge pulse control device cuts off a pulse width of the a discharge pulse being produced in a machining gap when a comparison result of a voltage level comparator indicates abnormal electrical discharge. Upon detection of abnormal electrical discharge based on comparison results of a high-frequency component comparator and the voltage level comparator, a quiescent period control unit constructed from a discharge pulse diagnosis device, a first pulse counter, a second pulse counter, and a quiescent pulse control device performs change setting of the quiescent period at the time of occurrence of abnormal electrical discharge and sends that information to the discharge pulse control device. Subsequently, the discharge pulse control device performs change control of the quiescent period at the time of occurrence of abnormal electrical discharge so that the discharge pulse and the quiescent time are optimally controlled.

12 Claims, 9 Drawing Sheets

MACHINING ELECTRODE : GRAPHITE RIB
 THICKNESS OF TIP 1 mm, OVERLAP OF 10 mm
MACHINING OBJECT : STEEL
LIQUID PROCESSING : JET-LESS
MACHINING CONDITIONS : PEAK CURRENT OF 45 A
 PULSE WIDTH OF 200 $\mu$s
 QUIESCENT PERIOD OF 500 $\mu$s
 JUMP-DOWN TIME OF 250 ms
 JUMP-UP DISTANCE OF 8.0 mm

POWER SOURCE CONTROLLER OF ELECTRICAL DISCHARGE MACHINE

CROSS REFERENCE TO RELATED APPLICATIONS

This application is a National Stage of International Application No. PCT/JP2008/051972 filed Feb. 6, 2008, the contents of all of which are incorporated herein by reference in their entirety.

TECHNICAL FIELD

The present invention relates to a power source controller for controlling a pulse discharge produced in a machining gap of a die-sinking electrical discharge machine.

BACKGROUND ART

A die-sinking electrical discharge machine performs electrical discharge machining on a machining object by producing a pulse discharge in a machining gap that is formed by disposing a machining electrode and the machining object opposite to each other. In a die-sinking electrical discharge machine, a power source controller controls a machining power source used for applying a machining voltage to the machining gap and controls the discharge pulse width (discharge duration) and the quiescent period of the pulse discharge produced in the machining gap.

Thus, a power source controller of a die-sinking electrical discharge machine is required to have the capability of maintaining the machining state at an optimum state. Hence, conventionally, various technologies have been disclosed for determining the electrical discharge state at the time of machining discharge (for example, Patent Literature 1, Patent Literature 2, etc.)

For example, in Patent Literature 1, a technology is disclosed for determining the electrical discharge state at the time of machining discharge by making use of a magnitude relation between a high-frequency component, which is superimposed on the discharge voltage at the time of machining discharge, and a reference value (see FIGS. 7 and 8 in Patent Literature 1). In addition, for the case when a discharge pulse produced in the machining gap is determined to be an abnormal discharge pulse on the basis of the magnitude relation between the high-frequency component and the reference value, a technology is disclosed for controlling the machining conditions in such a way that the electrical discharge state and the machining efficiency improves with the control of the quiescent period (see FIGS. 30 and 31 in Patent Literature 1).

In Patent Literature 2, a technology is disclosed for determining the electrical discharge state from a discharge voltage level at the time of electrical discharge machining that is detected using a reading window (see FIG. 1, FIG. 2 in Patent Literature 2).

Patent Literature 1: Japanese Patent Application Laid-open No. H5-293714 (FIG. 7, FIG. 8, FIG. 30, FIG. 31)
Patent Literature 2: Japanese Patent Application Laid-open No. S61-159326 (FIG. 1, FIG. 2)

DISCLOSURE OF INVENTION

Problem to be Solved by the Invention

However, in a die-sinking electrical discharge machine, if the electrical discharge state deteriorates or if abnormality occurs in the electrical discharge phenomenon, then an abnormal electrical discharge (what is known as arc discharge) occurs and appears in the form of a decrease in the discharge voltage. Such decrease in the discharge voltage is a common phenomenon when the machining electrode is made of graphite material or the like.

In Patent Literature 1, if a high-frequency component is superimposed on a discharge voltage that has decreased due to the occurrence of abnormal electrical discharge, then the configuration for detecting high-frequency components (FIG. 7) happens to detect that high-frequency component superimposed on the decreased discharge voltage. That makes it difficult to detect high-frequency components at the time of normal electrical discharge although such high-frequency components are supposed to be detected. For that reason, the machining state cannot be recognized in a correct manner.

Meanwhile, a decrease in the discharge voltage due to the occurrence of abnormal electrical discharge results in lowered efficiency in the electrical discharge machining. Hence, in such an electrical discharge state, the discharge pulse width should not be maintained at the predetermined width. However, in the configuration for controlling the quiescent period (FIG. 30) disclosed in Patent Literature 1, the determination of the electrical discharge stare is performed at the end of the discharge pulse width. Therefore, within the duration of the discharge pulse width, the decreased discharge voltage is maintained without change. Thus, although the discharge voltage decreases, it is not possible to eliminate the duration of occurrence of the decreased discharge voltage. For that reason, the discharge pulse width cannot be controlled in an optimal manner.

In the technology for comparing voltage levels detected using a reading window as disclosed in Patent Literature 2, there are times when a decrease in the voltage cannot be detected. Moreover, when the machining electrode is made of graphite material, it is not possible to reduce the granular projections that come into existence by adhesion of carbide onto the electrode corner portion.

Besides, in die-sinking electrical discharge machine, if the machining electrode or the machining object is made of a special material, then sometimes the level of the high-frequency component superimposed on the discharge voltage decreases or sometimes the high-frequency component does not appear for either of normal electrical discharge and abnormal electrical discharge. Hence, as disclosed in Patent Literature 1, in the configuration for determining the electrical discharge state only by detecting the high-frequency component (FIG. 7), the occurrence of abnormal electrical discharge goes undetected.

The present invention has been made in view of the above and it is an object of the present invention to provide a power source controller of an electrical discharge machine that, even if the discharge voltage decreases due to the occurrence of abnormal electrical discharge, accurately detects the electrical discharge state and controls the discharge pulse width and the quiescent period in an optimal manner.

Means for Solving Problem

To achieve the object, according to the present invention, a power source controller of an electrical discharge machine for controlling a discharge pulse width and a quiescent period of a pulse discharge produced in a machining gap of the electrical discharge machine includes: a high-frequency component detecting unit that detects a high-frequency component superimposed on a discharge voltage at time of electrical discharge occurring in the machining gap; a voltage level detecting unit that detects a voltage level of the discharge voltage; a high-frequency component comparator that compares a magnitude relation between the high-frequency component detected by the high-frequency component detecting unit and a high-frequency component reference value; a voltage level comparator that compares a magnitude relation between the voltage level detected by the voltage level detecting unit and a voltage level reference value; and a quiescent period control unit that, when abnormal electrical discharge is detected, outputs, based on a comparison result of the high-frequency component comparator and a comparison result of the voltage level comparator, a quiescent pulse that indicates an appropriate change in length of the quiescent period according to mode of occurrence of abnormal electrical discharge.

Effect of the Invention

According to an aspect of the present invention, even if the discharge voltage decreases due to the occurrence of abnormal electrical discharge, it is possible to accurately detect the electrical discharge state and control the discharge pulse width and the quiescent period in an optimal manner.

EXPLANATIONS OF LETTERS OR NUMERALS

Figure 1:
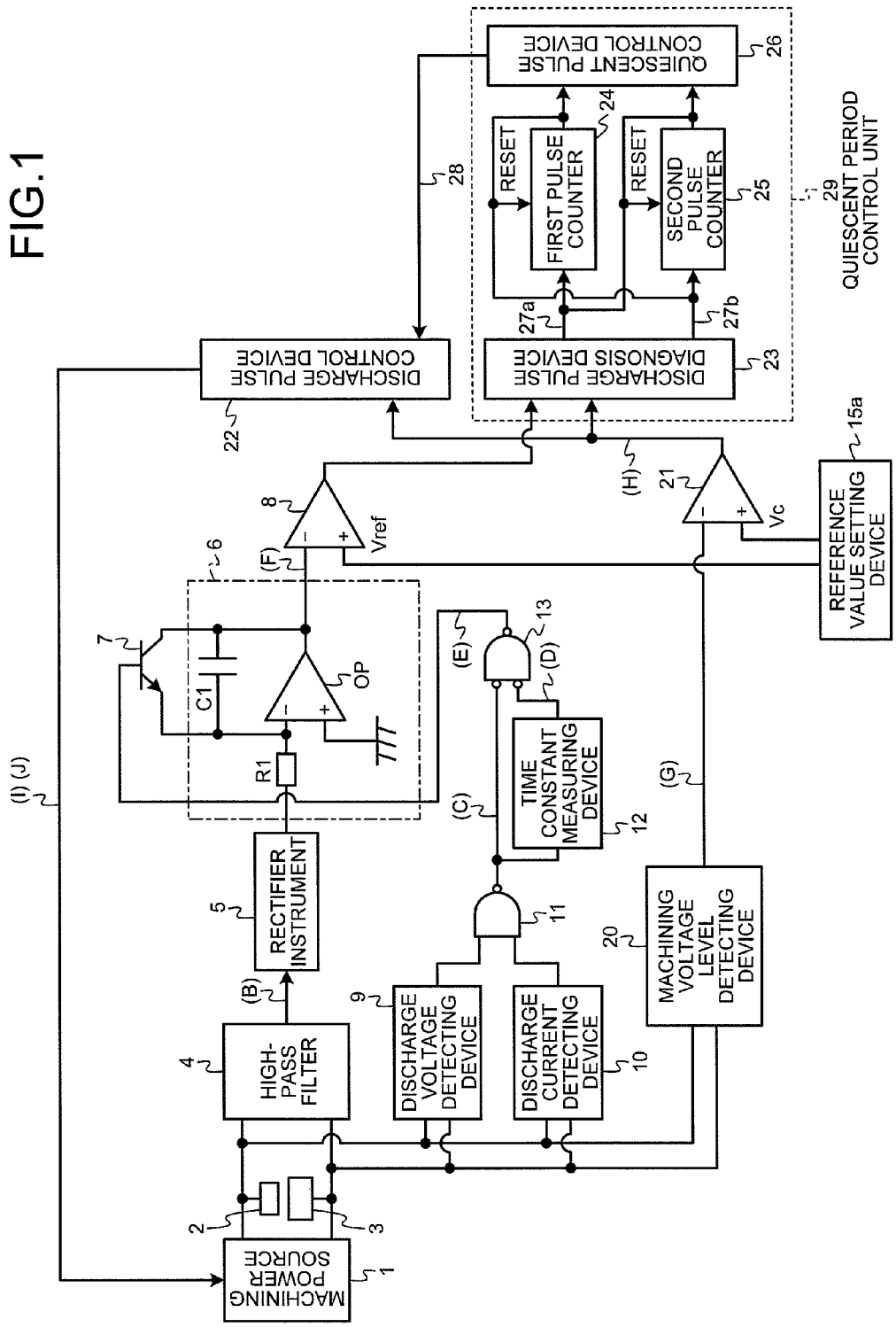
FIG. 1 is a block diagram illustrating a configuration of a power source controller of an electrical discharge machine according to a first embodiment of the present embodiment.

1 Machining power source
2 Machining electrode
3 Machining object
4 High-pass filter
5 Rectifier instrument
6 Integrating circuit
7 Reset transistor
8 High-frequency component comparator
9 Discharge voltage detecting device
10 Discharge current detecting device
11, 13 AND circuit
12 Time constant measuring device
15a, 15b Reference value setting device
20 Machining voltage level detecting device
21 Voltage level comparator
22 Discharge pulse control device
23 Discharge pulse diagnosis device
24 First pulse counter
25 Second pulse counter
26 Quiescent pulse control device
29 Quiescent period control unit
40 Third pulse counter
41 Fourth pulse counter
42 Normal discharge pulse incidence measuring device
43 Mean quiescent calculating device
44 Machining stability recognizing device
45 Machining condition control device

BEST MODE(S) FOR CARRYING OUT THE INVENTION

Exemplary embodiments for a power source controller of an electrical discharge machine according to the present invention will be described below in detail with reference to the accompanying drawings.

First Embodiment

FIG. 1 is a block diagram illustrating a configuration of a power source controller of an electrical discharge machine according to a first embodiment of the present embodiment. In FIG. 1, under the control of a discharge pulse control device 22, a machining power source 1 applies, to a machining gap formed by disposing a machining electrode 2 and a machining object 3 opposite to each other, a machining voltage that produces a pulse discharge with the discharge voltage (discharge pulse) of a predetermined pulse width.

A high-pass filter 4 extracts a high-frequency component that is superimposed on the discharge voltage at the time when a machining discharge occurs in the machining gap. A rectifier instrument 5 performs rectification/smoothing of the high-frequency component output by the high-pass filter 4 and then sends the high-frequency component to an integrating circuit 6.

The integrating circuit 6 includes an operating amplifier OP, a resistor R1 that is disposed in between the output terminal of the rectifier instrument 5 and the inverting input terminal (−) of the operating amplifier OP, and a capacitor C1 that is disposed in between the inverting input terminal (−) and the output terminal of the operating amplifier OP. The non-inverting input terminal (+) of the operating amplifier OP is connected to the circuit ground.

A reset transistor 7 has its emitter terminal connected to one end of the capacitor C1 and to the inverting input terminal (−) of the operating amplifier OP, has its collector terminal connected to the other end of the capacitor C1 and to the output terminal of the operating amplifier OP, and has its base terminal connected to the output terminal of an AND circuit 13. The reset transistor 7 switches to an ON operating state when the output level of the AND circuit 13 is at a low level (hereinafter referred to as "L level") and switches to an OFF operating state when the output level of the AND circuit 13 is at a high level (hereinafter referred to as "H level").

A high-frequency component comparator 8 has its inverting input terminal (−) connected to the output terminal of the operating amplifier OP and has its non-inverting input terminal (+) applied with a reference voltage Vref that is the high-frequency component reference value output from a reference value setting device 15a.

Thus, when the value of an integral output by the integrating circuit 6 does not exceed the reference voltage Vref, the high-frequency component comparator 8 sets the output level to the H level indicating that the discharge pulse being produced in the machining gap is an abnormal discharge pulse. When the value of the integral output by the integrating circuit 6 exceeds the reference voltage Vref, the high-frequency component comparator 8 sets the output level to the L level indicating that the discharge pulse being produced in the machining gap is a normal discharge pulse. The output of the high-frequency component comparator 8 is input to a discharge pulse diagnosis device 23.

A discharge voltage detecting device 9 detects the discharge voltage at the time when the machining discharge occurs in the machining gap and outputs that discharge voltage to an AND circuit 11. A discharge current detecting device 10 detects the discharge current at the time when the machining discharge occurs in the machining gap and sends that discharge current to the AND circuit 11 while performing voltage conversion. For a period of time in which both the inputs are at the H level, the AND circuit 11 sets the output level to the L level. The output of the AND circuit 11 is input to a time constant measuring device 12 and to the AND circuit 13.

The time constant measuring device 12 is a delaying circuit that delays the timing at which the output of the AND circuit 11 falls from the H level to the L level by an amount of time equivalent to a time constant of the high-pass filter 4 and then outputs the delayed timing to the AND circuit 13. For a period of time in which both the inputs are at the L level, the AND circuit 13 sets the output level to the L level.

The high-pass filter 4, the rectifier instrument 5, and the integrating circuit 6 described above collectively correspond to a high-frequency component detecting unit for detecting the high-frequency component superimposed on the discharge voltage at the time of a machining discharge occurring in the machining gap. The high-frequency component comparator 8 corresponds to a high-frequency component comparator having the same name. The discharge voltage detecting device 9, the discharge current detecting device 10, the AND circuit 11, the time constant measuring device 12, the AND circuit 13, and the reset transistor 7 collectively construct a reset circuit for resetting the integrating circuit 6. This is the configuration disclosed in, for example, Patent Literature 1.

In the first embodiment, there are additionally disposed a machining voltage level detecting device 20, which corresponds to a voltage level detecting unit, and a voltage level comparator 21, which corresponds to a voltage level comparator. Besides, a number of functions have been added to the discharge pulse control device 22. Moreover, the discharge pulse diagnosis device 23, a first pulse counter 24, a second pulse counter 25, and a quiescent pulse control device 26 are disposed to collectively construct a quiescent period control unit 29.

The machining voltage level detecting device 20 detects, similarly to the discharge voltage detecting device 9, the discharge voltage at the time when the machining discharge occurs in the machining gap. Thus, although a single device can be used in a shared manner, separate devices are illustrated to facilitate understanding.

The voltage level comparator 21 has its inverting input terminal (−) connected to the output terminal of the machining voltage level detecting device 20 and has its non-inverting input terminal (+) applied with a reference voltage Vc that is the voltage level reference value output from the reference value setting device 15a.

When the output level from the machining voltage level detecting device 20 exceeds the reference voltage Vc, the voltage level comparator 21 sets the output level to the L level indicating that the discharge pulse being produced in the machining gap is a normal discharge pulse. When the output level from the machining voltage level detecting device 20 falls below the reference voltage Vc, the voltage level comparator 21 sets the output level to the H level indicating that the discharge pulse being produced in the machining gap is an abnormal discharge pulse. Moreover, if the output level from the machining voltage level detecting device 20 falls below the reference voltage Vc within the electrical discharge period, then the voltage level comparator 21 raises the output level from the L level to the H level at that point of time thereby indicating that the discharge pulse being produced in the machining gap has changed from a normal discharge pulse to an abnormal discharge pulse. The output of the voltage level comparator 21 is input to the discharge pulse control device 22 and the discharge pulse diagnosis device 23.

At the end of the ordinary electrical discharge period in the corresponding electrical discharge machining, the discharge pulse diagnosis device 23 performs diagnosis for determining whether the discharge pulse being produced in the machining gap is a normal discharge pulse (normal pulse) or an abnormal discharge pulse (faulty pulse) based on the comparison result of the high-frequency component comparator 8 and the comparison result of the voltage level comparator 21.

Specifically, when the output level from the voltage level comparator 21 is at the L level and when the output level from the high-frequency component comparator 8 is at the L level, the discharge pulse diagnosis device 23 determines that the discharge pulse is a normal pulse. In comparison, when the output level from the voltage level comparator 21 is at the H level or when the output level from the voltage level comparator 21 is at the L level but the output level from the high-frequency component comparator 8 is at the H level, the discharge pulse diagnosis device 23 determines that the discharge pulse is a faulty pulse.

Upon determining that the discharge pulse is a normal pulse, the discharge pulse diagnosis device 23 outputs that as a normality determination pulse 27a to a count input terminal of the first pulse counter 24 and a reset input terminal of the second pulse counter 25. In contrast, upon determining that the discharge pulse is a faulty pulse, the discharge pulse diagnosis device 23 outputs that as a fault determination pulse 27b to a count input terminal of the second pulse counter 25 and a reset input terminal of the first pulse counter 24.

An output terminal of the first pulse counter 24 is connected to the quiescent pulse control device 26 and to the reset input terminal of the own counter. Similarly, an output terminal of the second pulse counter 25 is connected to the quiescent pulse control device 26 and to the reset input terminal of the own counter.

The first pulse counter 24 counts the normality determination pulse 27a input from the discharge pulse diagnosis device 23 and outputs the count value sequentially to the quiescent pulse control device 26. If the discharge pulse diagnosis device 23 outputs the fault determination pulse 27b during the counting operation, then the count is reset at that point of time. When the normality determination pulse 27a is counted for M number of times in succession, the first pulse counter 24 outputs the count value M to the quiescent pulse control device 26 and resets the own counter.

The second pulse counter 25 counts the fault determination pulse 27b input from the discharge pulse diagnosis device 23 and outputs the count value sequentially to the quiescent pulse control device 26. If the discharge pulse diagnosis device 23 outputs the normality determination pulse 27a during the counting operation, then the count is reset at that point of time. When the fault determination pulse 27b is counted for L number of times in succession, the second pulse counter 25 outputs the count value L to the quiescent pulse control device 26 and resets the own counter.

Based on whether the count value of the first pulse counter is equal to M and whether the count value of the second pulse counter is equal to L, the quiescent pulse control device 26 performs setting control of optimal quiescent period, generates a quiescent pulse 28 having the pulse width equal to the set quiescent period, and outputs the quiescent pulse 28 to the discharge pulse control device 22.

The discharge pulse control device 22 monitors the output level of the voltage level comparator 21 for any variation during the ordinary electrical discharge period in the corresponding electrical discharge machining and, if the output level of the voltage level comparator 21 remains stable at the L level during the ordinary electrical discharge period, determines that normal electrical discharge is occurring. In that case, the discharge pulse control device 22 controls the application of voltage with respect to the machining power source 1 in order to cause repeated generation of the discharge pulse having a predetermined discharge voltage/pulse width in the machining gap with a predetermined quiescent period secured in between the repeated generation.

Moreover, the discharge pulse control device 22 monitors the output level of the voltage level comparator 21 for any variation during the ordinary electrical discharge period in the corresponding electrical discharge machining and, if the output level rises from the L level to the H level during the ordinary electrical discharge period, determines that abnormal electrical discharge has occurred after normal electrical discharge during the ordinary electrical discharge period. In that case, with respect to the machining power source 1, the discharge pulse control device 22 performs control so that the pulse width of the discharge pulse being produced in the machining gap is cut off at the normal electrical discharge duration and the discharge pulse having the reduced pulse width is repeatedly generated with a predetermined quiescent period, which is indicated by the quiescent pulse 28 input from the quiescent pulse control device 26, secured in between the repeated generation.

Figure 2:
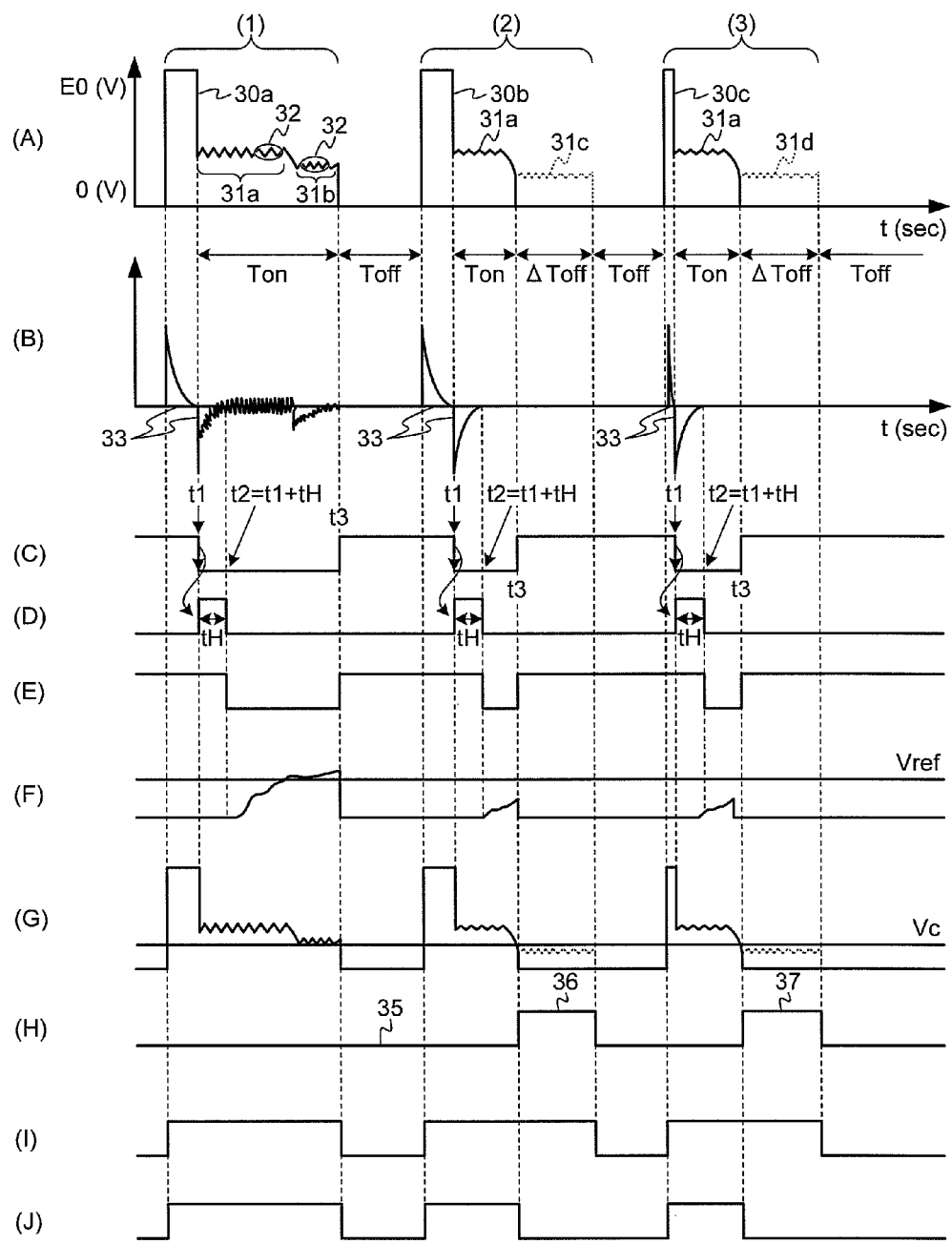
FIG. 2 is a waveform chart explaining the operations performed by components, except a quiescent period control unit, of the power source controller illustrated in FIG. 1.
Figure 3:
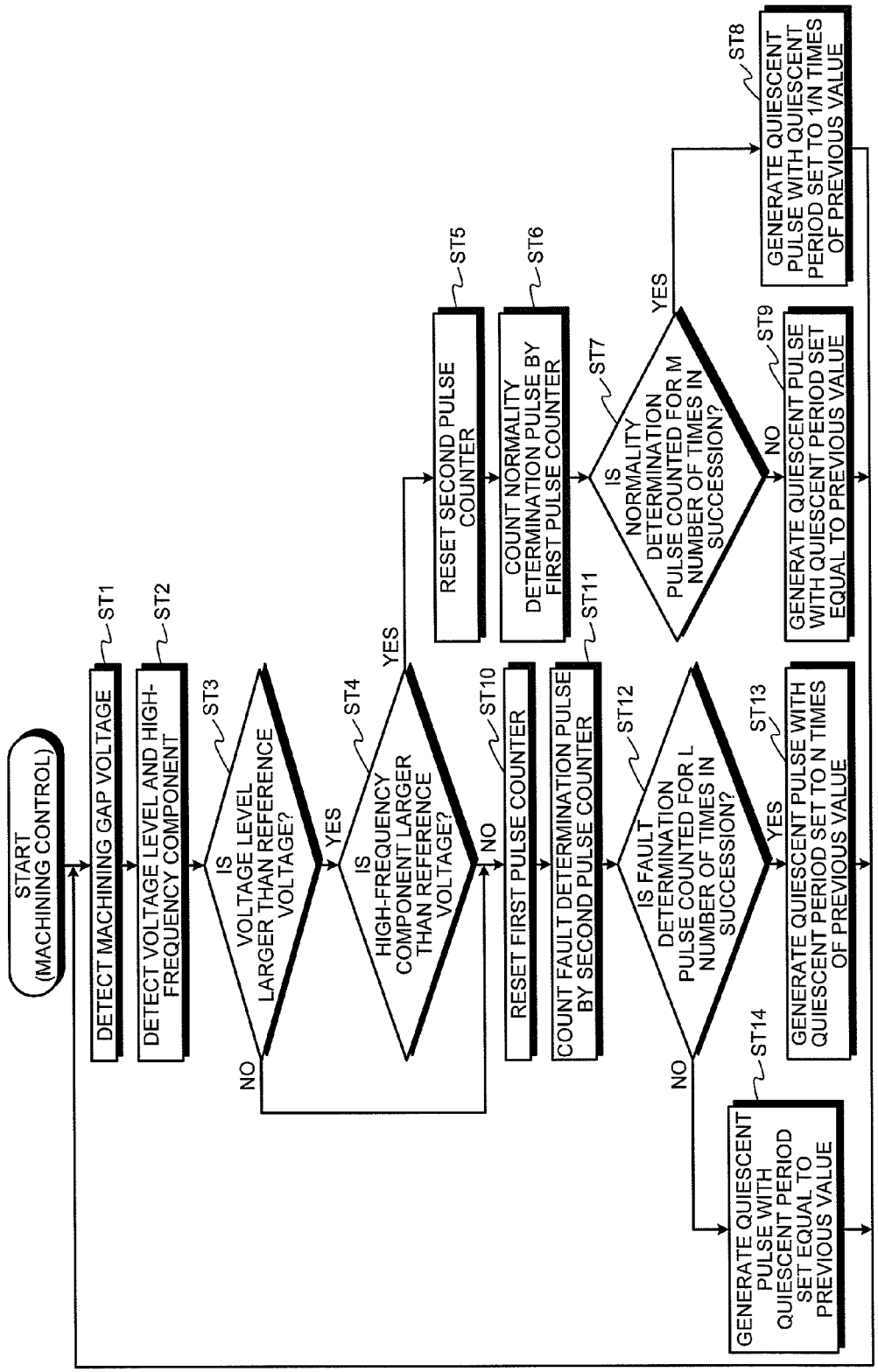
FIG. 3 is a flowchart explaining a quiescent period control operation performed by the quiescent period control unit in the power source controller illustrated in FIG. 1.

The explanation regarding operations is given with reference to FIGS. 1 to 3. FIG. 2 is a waveform chart explaining the operations performed by the components, except the quiescent period control unit, of the power source controller illustrated in FIG. 1. FIG. 3 is a flowchart explaining a quiescent period control operation performed by the quiescent period control unit in the power source controller illustrated in FIG. 1.

In FIG. 2, examples of operations performed by the components, except the quiescent period control unit 29, at three types of electrical discharge states (1) to (3) are illustrated as waveforms (A) to (J). In the electrical discharge state (1), examples of operations performed by the components are illustrated when normal electrical discharge occurs during the ordinary electrical discharge period. In the electrical discharge states (2) and (3), examples of operations (first example and second example, respectively) performed by the components are illustrated when abnormal electrical discharge during the ordinary electrical discharge period leads to the execution of cutoff control and quiescent period control of the discharge pulse.

In the waveform (A) is represented a relation between waveforms of three types of discharge voltages and the quiescent period in the machining gap. In the waveform (B) is represented an output signal waveform of the high-pass filter 4. In the waveform (C) is represented an output signal waveform of the AND circuit 11. In the waveform (D) is represented an output signal waveform of the time constant measuring device 12. In the waveform (E) is represented an output signal waveform of the AND circuit 13. In the waveform (F) is represented an output signal waveform of the integrating circuit 6. In the waveform (G) is represented an output signal waveform of the machining voltage level detecting device 20. In the waveform (H) is represented an output signal waveform of the voltage level comparator 21. In the waveforms (I) and (J) are respectively represented a first control signal waveform and a second control signal waveform as control instructions issued by the discharge pulse control device 22 to the machining power source 1.

FIG. 2 is given with the purpose of explaining the execution of cutoff control of the discharge pulse at the time of occurrence of abnormal electrical discharge that is carried out by the discharge pulse control device 22 based on the comparison result of the voltage level comparator 21. In that regard, the related waveforms are the waveforms (G) to (J). Meanwhile, in the diagnosis performed by the discharge pulse diagnosis device 23 of the quiescent period control unit 29, the waveforms (B) to (F) as well as the waveforms (G) to (J) are involved. In the conventional technology, the electrical discharge state is determined only on the basis of the waveforms (B) to (F).

In the waveform (A), each of reference numerals 30a, 30b, and 30c represents a pre-machining-discharge machining voltage that is applied to the machining gap and that falls down to a predetermined discharge voltage level once the machining discharge starts. Moreover, "Ton" represents the electrical discharge period (discharge pulse width) and "Toff" represents a predetermined quiescent period. In the first embodiment, upon occurrence of abnormal electrical discharge, the quiescent period control unit 29 considers the quiescent period Toff as the unit quiescent period and controls the length of the actual quiescent period by following a sequence described later with reference to FIG. 3. Meanwhile, "ΔToff" is a quasi quiescent period in which no actual operation is performed because the discharge pulse control device 22 cuts off the ordinary electrical discharge period (discharge pulse width) due to the occurrence of abnormal electrical discharge.

In the electrical discharge state (1) in the waveform (A), it is illustrated that the machining discharge starts after the elapse of a given applied time and the applied voltage 30a becomes a discharge voltage 31a, which then decreases to become a discharge voltage 31b. In the illustrated example, on each discharge voltage is superimposed a high-frequency component 32 but the extent of decrease from the discharge voltage 31a to the discharge voltage 31b is small. Hence, it is determined that normal electrical discharge has occurred during the entire occurrence period of the discharge voltage 31a and the discharge voltage 31b. In this case, the control is performed so that the predetermined quiescent period Toff is inserted after the elapse of the discharge pulse width Ton, which corresponds to the ordinary electrical discharge period (entire occurrence period of the discharge voltage 31a and the discharge voltage 31b).

In the electrical discharge state (2) in the waveform (A), it is illustrated that the machining discharge starts after the elapse of an applied time that is almost identical to the applied time in the electrical discharge state (1) and the applied voltage 30b becomes the discharge voltage 31a, which then decreases to become a discharge voltage 31c. In the illustrated example, the electrical discharge state is almost comparable with the electrical discharge state (1). However, there is occurrence of abnormal electrical discharge. Hence, although the superimposed high-frequency component is small, the extent of decrease from the discharge voltage 31a to the discharge voltage 31c is large. Consequently, it is determined that abnormal electrical discharge has occurred at the time of switching to the discharge voltage 31c during the occurrence period of the discharge voltage 31a. In this case, the ordinary electrical discharge period (entire occurrence period of the discharge voltage 31a and the discharge voltage 31c) is cut off at the end of the occurrence period of the discharge voltage 31a. Moreover, after the elapse of the narrow discharge pulse width Ton attributed to the occurrence period of the discharge voltage 31a, the ordinary electrical discharge period is forcibly terminated. The cut-off and eliminated occurrence period of the discharge voltage 31c then becomes the period in which no actual operation is performed (i.e., quasi quiescent period $\Delta$Toff). Subsequently, it is illustrated that the predetermined quiescent period Toff is inserted. The actual quiescent period inserted after the elapse of the narrow discharge pulse width Ton is determined such that the quiescent period control unit 29 controls the length of the quiescent period Toff by following the sequence described later with reference to FIG. 3.

In the electrical discharge state (3) in the waveform (A), it is illustrated that the machining discharge starts after the elapse of a short applied time and the applied voltage 30c becomes the discharge voltage 31a, which then decreases to become a discharge voltage 31d. In the illustrated example, the electrical discharge state becomes more unstable than the electrical discharge state (2) and there is occurrence of abnormal electrical discharge. Hence, although the superimposed high-frequency component is small, the extent of decrease from the discharge voltage 31a to the discharge voltage 31d is large. Consequently, it is determined that abnormal electrical discharge has occurred at the time of switching to the discharge voltage 31d during the occurrence period of the discharge voltage 31a. In this case, the ordinary electrical discharge period (entire occurrence period of the discharge voltage 31a and the discharge voltage 31d) is cut off at the end of the occurrence period of the discharge voltage 31a. Moreover, after the elapse of the narrow discharge pulse width Ton attributed to the occurrence period of the discharge voltage 31a, the ordinary electrical discharge period is forcibly terminated. The cut-off and eliminated occurrence period of the discharge voltage 31d then becomes the period in which no actual operation is performed (i.e., quasi quiescent period $\Delta$Toff). Subsequently, it is illustrated that the predetermined quiescent period Toff is inserted. The actual quiescent period inserted after the elapse of the narrow discharge pulse width Ton is determined such that the quiescent period control unit 29 controls the length of the quiescent period Toff by following the sequence described later with reference to FIG. 3.

Given below is the detailed description, with reference to the waveforms (B) to (F), of the operations performed by the components in the electrical discharge states (1) to (3).

First, the operations performed by the high-frequency component detecting unit are explained with reference to the waveforms (B) to (F). In the reset circuit, each of the discharge voltage detecting device 9 and the discharge current detecting device 10 has the output level prior to the start of the machining discharge set to the L level. Then, at a time t1 at which the machining discharge starts, the output level is set to the H level; and at a time t3 at which the machining discharge ends, the output level is set to the L level from the H level. Thus, as illustrated in the waveform (C), the output level of the AND circuit 11 is at the H level prior to the start of the machining discharge, falls to the L level at the time t1, remains at the L level until the time t3 at which the machining discharge ends, and rises to the H level at the time t3.

In the example given in FIG. 2, as illustrated in the waveform (A), the electrical discharge waveforms (solid lines) in the electrical discharge states (2) and (3) represent the conditions after the discharge pulse width has been cut off, while the electrical discharge waveform in the electrical discharge state (1) represents the condition when the discharge pulse width is not cut off. Hence, in the electrical discharge states (2) and (3), the duration between the machining discharge start time t1 and the machining discharge end time t3 is shorter than the corresponding duration in the electrical discharge state (1).

As illustrated in the waveform (D), the time constant measuring device 12 has the output level set to the H level for the period starting from the discharge start time t1, at which the output level of the AND circuit 11 falls to the L level, to a time t2 that corresponds to an elapsed time equivalent to a time constant tH of the high-pass filter 4.

Consequently, as illustrated in the waveform (E), the AND circuit 13 has the output level set to the L level within the period from the time t2 when both the inputs are at the L level to the time t3. Moreover, in the example given in FIG. 2, the period corresponding to the L level is long in the electrical discharge state (1) but becomes shorter in the electrical discharge states (2) and (3) because of the forcible termination.

In the high-pass filter 4, in the electrical discharge state (1) as illustrated in the waveform (B), the high-frequency component superimposed on the discharge voltage 31a is extracted from the discharge start time t1 and the high-frequency component superimposed on the discharge voltage 31b is extracted from the time of switching to the discharge voltage 31b. In contrast, in the electrical discharge states (2) and (3), since the high-frequency components superimposed on the respective discharge voltages are small even before performing the forcible termination, the extracted amounts of the high-frequency components are extremely small. Meanwhile, in the waveform (B), the reference numeral 33 represents a disturbance waveform attributed to the transient property of the high-pass filter 4.

During the period when the output level of the AND circuit 13 is at the H level, the reset transistor 7 performs an ON operation and the integrating circuit 6 is in a reset state. During the period when the output level of the AND circuit 13 is at the L level, the reset transistor 7 switches to an OFF operating state. Thus, during that period, the integrating circuit 6 performs integration regarding the high-frequency component extracted by the high-pass filter 4.

Consequently, as illustrated in the waveform (F), the output level of the integrating circuit 6 in the electrical discharge state (1) exceeds the reference voltage Vref of the high-frequency component comparator 8 because of a large amount of high-frequency component extracted by the high-pass filter 4. However, in the electrical discharge states (2) and (3), the output level of the integrating circuit 6 falls below the reference voltage Vref of the high-frequency component comparator 8 because the amount of high-frequency component extracted by the high-pass filter 4 is extremely small. In FIG. 2, although the output level of the integrating circuit 6 in the electrical discharge states (2) and (3) during the ordinary electrical discharge period without forcible termination is not illustrated, that output level also falls below the reference voltage Vref of the high-frequency component comparator 8.

Accordingly, the high-frequency component comparator 8, which compares the output level of the integrating circuit 6 with the reference voltage Vref, has the output level set to the L level in the electrical discharge state (1) thereby indicating normal electrical discharge and has the output level set to the H level in the electrical discharge states (2) and (3) thereby indicating abnormal electrical discharge. Meanwhile, in the first embodiment, the high-frequency component comparator 8 performs comparison with the output level of the integrating circuit 6 during the ordinary electrical discharge period without forcible termination. That is, the high-frequency component comparator 8 does not perform comparison with the output level of the integrating circuit 6 during the forcibly-terminated elapse time of the discharge pulse width Ton in the electrical discharge states (2) and (3) illustrated in the waveform (A).

In the conventional technology, the electrical discharge state is determined only by performing high-frequency component detection as described above. However, according to the conventional technology, if the extracted amount of the high-frequency component is large as illustrated by the electrical discharge waveform in the electrical discharge state (1) in the waveform (A), then, even if the extent of decrease in the voltage from the discharge voltage 31a is large, the largely-decreased discharge voltage is detected as normal voltage if the extracted high-frequency component exceeds the reference voltage Vref. Hence, it is difficult to accurately figure out the normal electrical discharge period.

Moreover, if the extracted amount of the high-frequency component is small as illustrated by the electrical discharge waveform in the electrical discharge state (2) or the electrical discharge state (3) in the waveform (A), then, even if the extent of decrease from the discharge voltage 31a to the discharge voltage 31c or to the discharge voltage 31d is large, it is determined that abnormal electrical discharge has occurred during the entire electrical discharge period in both the electrical discharge states (2) and (3) because the extracted high-frequency component falls below the reference voltage Vref.

Thus, in the first embodiment, the machining voltage level detecting device 20 and the voltage level comparator 21 are disposed. Moreover, the discharge pulse control device 22 is configured to perform cutoff control of the discharge pulse width for eliminating the occurrence period of abnormal electrical discharge based only on the comparison result of the voltage level comparator 21. Besides, the discharge pulse control device 22 is configured to perform insertion control of the quiescent period including the occurrence period of eliminated abnormal electrical discharge in accordance with the quiescent pulse 28 generated by the quiescent period control unit 29 by following the sequence described later with reference to FIG. 3.

In the electrical discharge state (1), the extent of decrease from the discharge voltage 31a to the discharge voltage 31b is small. Therefore, as for the output level of the machining voltage level detecting device 20, the discharge voltage 31b also exceeds the reference voltage Vc of the voltage level comparator 21 as illustrated in the waveform (G). Consequently, during the entire occurrence period of the discharge voltage 31a and the discharge voltage 31b, the voltage level comparator 21 has the output level at L level 35 indicating normal electrical discharge as illustrated in the waveform (H).

In contrast, in the electrical discharge state (2), the extent of decrease from the discharge voltage 31a to the discharge voltage 31c is large. Therefore, as for the output level of the machining voltage level detecting device 20, the discharge voltage 31c falls below the reference voltage Vc of the voltage level comparator 21 as illustrated in the waveform (G). Consequently, as illustrated in the waveform (H), the voltage level comparator 21 has the output level at the L level, which indicates normal electrical discharge, during the occurrence period of the discharge voltage 31a but has the output level at H level 36, which indicates abnormal electrical discharge, during the occurrence period of the discharge voltage 31c.

Similarly, in the electrical discharge state (3), the extent of decrease from the discharge voltage 31a to the discharge voltage 31d is large. Therefore, as for the output level of the machining voltage level detecting device 20, the discharge voltage 31d falls below the reference voltage Vc of the voltage level comparator 21 as illustrated in the waveform (G). Consequently, as illustrated in the waveform (H), the voltage level comparator 21 has the output level at the L level, which indicates normal electrical discharge, during the occurrence period of the discharge voltage 31a but has the output level at H level 37, which indicates abnormal electrical discharge, during the occurrence period of the discharge voltage 31d.

By setting the reference voltage Vc of the voltage level comparator 21 to an appropriate voltage that enables performing determination of whether a decrease in the voltage occurring during the ordinary electrical discharge period is within the range to be regarded as normal electrical discharge, it becomes possible to accurately figure out the occurrence timing of abnormal electrical discharge during the ordinary electrical discharge period and thus detect the normal electrical discharge duration and the abnormal electrical discharge duration within the ordinary electrical discharge period.

The discharge pulse control device 22 makes use of the first control signal and the second control signal represented by the waveforms (I) and (J), respectively, to perform cutoff control of the discharge pulse width and change control of the quiescent period at the time of occurrence of abnormal electrical discharge. In the waveforms (I) and (J), the period of H level is when the machining power source 1 is applying a machining voltage and the period of L level is when the machining power source 1 is not applying the machining voltage.

The discharge pulse control device 22 first monitors the output level of the voltage level comparator 21 for any variation as described above while repeatedly sending the first control signal represented by the waveform (I) to the machining power source 1.

In the waveform (I), in each of the electrical discharge states (1) to (3), a signal waveform is illustrated that is at the H level during the ordinary electrical discharge period and is at the L level during the subsequent ordinary quiescent period. The machining power source 1 receives the first control signal represented by the waveform (I) and applies, to the machining gap, a machining voltage for causing repeated generation of a discharge pulse having the ordinary pulse width with the ordinary quiescent period secured in between the repeated generation.

As illustrated in the waveform (A), in the electrical discharge state (1), the entire occurrence period of the discharge voltage 31a and the discharge voltage 31b is the ordinary electrical discharge time; in the electrical discharge state (2), the entire occurrence period of the discharge voltage 31a and the discharge voltage 31c is the ordinary electrical discharge time; and in the electrical discharge state (3), the entire occurrence period of the discharge voltage 31a and the discharge voltage 31d is the ordinary electrical discharge time. Besides, the ordinary quiescent period is equal to the quiescent period Toff. Hence, in the waveform (I), in the electrical discharge state (1), the H level is set for the entire occurrence period of the discharge voltage 31a and the discharge voltage 31b; in the electrical discharge state (2), the H level is set for the entire occurrence period of the discharge voltage 31a and the discharge voltage 31c; and in the electrical discharge state (3), the H level is set for the entire occurrence period of the discharge voltage 31a and the discharge voltage 31d.

While the first control signal represented by the waveform (I) is being repeatedly output, if there is no variation as described above in the output level of the voltage level comparator 21 and if the output level remains at the L level as illustrated in the electrical discharge state (1), then the discharge pulse control device 22 determines that normal electrical discharge has occurred during the ordinary electrical discharge period and that there has been no occurrence of abnormal electrical discharge. The discharge pulse control device 22 then outputs the second control signal represented by the waveform (J) that has a waveform similar to the waveform (I). The machining power source 1 receives the second control signal represented by the waveform (J) and, similarly to that after receiving the first control signal, applies, to the machining gap, a machining voltage for causing repeated generation of a discharge pulse having the ordinary pulse width with the ordinary quiescent period secured in between the repeated generation.

While the first control signal represented by the waveform (I) is being repeatedly output, if the output level of the voltage level comparator 21 changes from the L level to the H level during the ordinary electrical discharge period, then the discharge pulse control device 22 determines that abnormal electrical discharge has occurred during the ordinary electrical discharge period. The discharge pulse control device 22 then cuts off the ordinary electrical discharge period at the timing at which the output level of the voltage level comparator 21 changes from the L level to the H level and up to which normal electrical discharge has occurred. Subsequently, in order to eliminate the period of abnormal electrical discharge, the discharge pulse control device 22 outputs the second control signal represented by the waveform (J) that has a difference waveform than the waveform (I).

Thus, the second control signal waveform (J) used in the electrical discharge states (2) and (3) is a waveform that is set to the H level for the occurrence period of the discharge voltage 31a, which is the duration of occurrence of normal electrical discharge, and then changes to the L level. The period corresponding to the occurrence period of the discharge voltages 31c and 31d within the L level period in the second control signal waveform (J) becomes the period in which no actual operation is performed (i.e., quasi quiescent period $\Delta$Toff). Then, according to the quiescent pulse 28 obtained from the quiescent period control unit 29, the discharge pulse control device 22 outputs, to the machining power source 1, the second control signal represented by the waveform (J) that determines a length of the actual quiescent period that includes the period in which no actual operation is performed.

The machining power source 1 receives the second control signal represented by the waveform (J) and used in the electrical discharge states (2) and (3), and applies to the machining gap a machining voltage for causing repeated generation of a discharge pulse having the occurrence period of the discharge voltage 31a as the pulse width (discharge pulse width Ton) with the quiescent period (quasi quiescent period $\Delta$Toff+quiescent period Toff) secured in between the repeated generation. The electrical discharge waveforms (solid lines) and the quiescent period in the electrical discharge states (2) and (3) in the waveform (A) are those that are set and controlled in the process described above.

Explained below with reference to FIGS. 1 to 3 is the quiescent period control operation performed by the quiescent period control unit 29 that is collectively constructed from the discharge pulse diagnosis device 23, the first pulse counter 24, the second pulse counter 25, and the quiescent pulse control device 26. Herein, for the sake of simplicity in the explanation, it is assumed that the discharge pulse control device 22 outputs the second control signal represented by the waveform (J) in FIG. 2. That is, the electrical discharge waveforms assumed herein are the electrical discharge waveforms (solid lines) in the electrical discharge states (2) and (3) illustrated in the waveform (A) in FIG. 2. Meanwhile, in the description with reference to FIG. 3, the steps indicating the sequence of operations are abbreviated to "ST".

With reference to FIG. 3, upon detecting the discharge voltage in the machining gap (ST1) and upon detecting the voltage level and the high-frequency component based on the discharge voltage (ST2), the comparison results of the two comparators 8 and 21 are input to the discharge pulse diagnosis device 23.

At the end of the ordinary electrical discharge period in the corresponding electrical discharge machining, the discharge pulse diagnosis device 23 first determines, from the output level of the voltage level comparator 21, whether the voltage level is larger than the reference voltage Vc (ST3). In the electrical discharge waveforms (solid lines) in the electrical discharge states (2) and (3) illustrated in the waveform (A), at the end of the ordinary electrical discharge period, the output level of the voltage level comparator 21 is at the H level 36 and the H level 37, respectively, and the voltage level is smaller than the reference voltage Vc (No at ST3). Thus, the discharge pulse diagnosis device 23 outputs the fault determination pulse 27b without determining the output level of the high-frequency component comparator 8.

Consequently, the first pulse counter 24 is reset (ST10) and the second pulse counter 25 starts the counting operation (ST11). In this example, the second pulse counter 25 counts the fault determination pulse 27b for a single time.

Until the second pulse counter 25 counts the fault determination pulse 27b for L number of times (e.g., L=2) in succession (No at ST12), the quiescent pulse control device 26 generates the quiescent pulse 28 having the quiescent period set identical to the previous value (in this example, the unit quiescent period Toff) and outputs the quiescent pulse 28 to the discharge pulse control device 22 (ST14). The system control then returns to ST1.

The discharge pulse control device 22 outputs, to the machining power source 1, the second control signal represented by the waveform (J) in which the actual quiescent period including the period in which no operation is performed (i.e., quasi quiescent period $\Delta$Toff) is set as the unit quiescent period Toff. For that reason, the electrical discharge state in the subsequent electrical discharge cycle can be expected to improve.

At ST3 reached via ST1 and ST2, if the voltage level is still smaller than the reference voltage Vc (No at ST3), the fault determination pulse 27b is counted for L=2 times at ST11 reached via ST10 so that the determination at ST12 is affirmative (Yes).

Consequently, the quiescent pulse control device 26 generates the quiescent pulse 28 having the quiescent period set to N times (e.g., N=2) of the previous value (in this example, the unit quiescent period Toff) and outputs the quiescent pulse 28 to the discharge pulse control device 22 (ST13). The system control then returns to ST1.

The discharge pulse control device 22 outputs, to the machining power source 1, the second control signal represented by the waveform (J) in which the actual quiescent period including the period in which no operation is performed (i.e., quasi quiescent period ΔToff) is set as double of the unit quiescent period Toff. For that reason, the electrical discharge state in the subsequent electrical discharge cycle can be expected to improve.

Subsequently, at ST3 reached vie ST1 and ST2, if the voltage level is still smaller than the reference voltage Vc (No at ST3), then identical quiescent period control is performed with double of the unit quiescent period Toff set as the previous value. In short, until the voltage level exceeds the reference voltage Vc (No at ST3), identical quiescent period control is repeated with the abovementioned previous value set to the multiples of N (N=2).

At S3 reached via S1 and S2 during that repetitive operation, when the voltage level exceeds the reference voltage Vc (Yes at ST3), the discharge pulse diagnosis device 23 determines, from the output level of the high-frequency component comparator 8, whether the high-frequency component is larger than the reference voltage Vref (ST4).

In this example, in the electrical discharge waveforms (solid lines) in the electrical discharge states (2) and (3) illustrated in the waveform (A) in FIG. 2, the extracted amount of the high-frequency component is small. Thus, the discharge pulse diagnosis device 23 determines that the high-frequency component is smaller than the reference voltage Vref (No at ST4) and outputs the fault determination pulse 27b. Subsequently, the operations at ST10 to ST14 are performed so that the quiescent period becomes longer. Because of that, it can be considered that the electrical discharge state improves to the extent of curbing the occurrence of abnormal electrical discharge and moves into the state of a longer normal electrical discharge period.

As a result, when the high-frequency component exceeds the reference voltage Vref, the determination at ST4 reached via ST1 to ST3 is affirmative (Yes at ST4) and the discharge pulse diagnosis device 23 outputs the normality determination pulse 27a.

Hence, the second pulse counter 25 is reset (ST5) and the first pulse counter 24 starts the counting operation (ST6). In this example, the first pulse counter 24 counts the normality determination pulse 27a for a single time.

Until the first pulse counter 24 counts the normality determination pulse 27a for M number of times (e.g., M=2) in succession (No at ST7), the quiescent pulse control device 26 generates the quiescent pulse 28 having the quiescent period set equal to the previous value (in this example, even multiple of the unit quiescent period Toff) and outputs the quiescent pulse 28 to the discharge pulse control device 22 (ST9). The system control then returns to ST1.

The discharge pulse control device 22 outputs, to the machining power source 1, the actual quiescent period including the period in which no operation is performed (i.e., quasi quiescent period ΔToff) and the second control signal represented by the waveform (J) set to the previous value (even multiple of unit quiescent period Toff).

When the first pulse counter 24 counts the normality determination pulse 27a for M number of times (M=2) in succession (Yes at ST7), the quiescent pulse control device 26 generates the quiescent pulse 28 having the quiescent period set to 1/N times of the previous value (in this example, even multiple of the unit quiescent period Toff) and outputs the quiescent pulse 28 to the discharge pulse control device 22 (ST8). The system control then returns to ST1.

The discharge pulse control device 22 outputs, to the machining power source 1, the actual quiescent period including the period in which no operation is performed (i.e., quasi quiescent period ΔToff) and the second control signal represented by the waveform (J) set to 1/N times of the previous value (in this example, even multiple of the unit quiescent period Toff).

That is, in the operations from ST4 to ST9, the quiescent period lengthened at ST12 to ST14 for curbing the occurrence of abnormal electrical discharge is reset to or approximated to the ordinary predetermined quiescent period Toff that was used for the ordinary discharge pulse width. Although not illustrated in FIG. 3, if the quiescent period lengthened in order to curb the occurrence of abnormal electrical discharge cannot be reset to the ordinary predetermined quiescent period Toff by performing the operations from ST4 to ST9 only once, then those operations can be performed more than once. As described above, the quiescent period control is performed.

Figure 4:
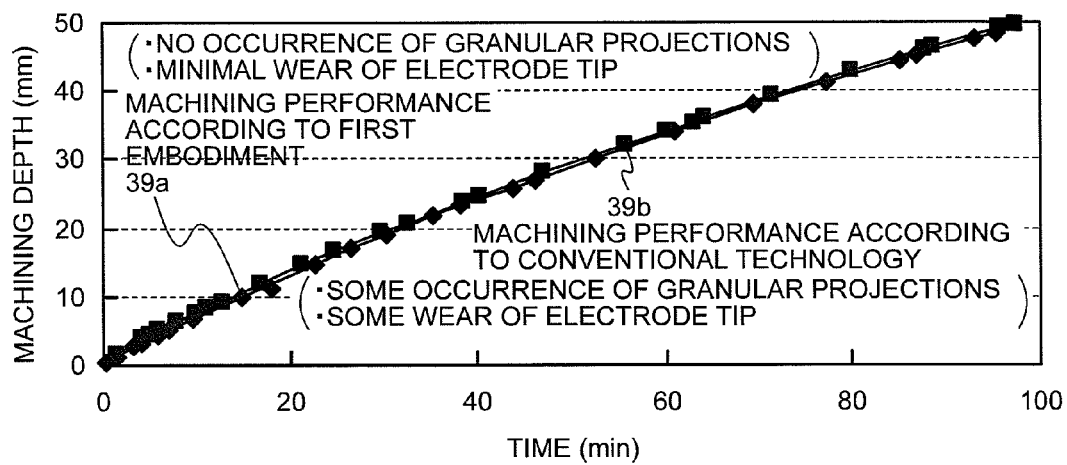
FIG. 4 is a machining characteristic diagram illustrating a comparison between the machining characteristic according to the first embodiment and the machining characteristic according to the conventional technology.

FIG. 4 is a machining characteristic diagram illustrating a comparison between the machining characteristic according to the first embodiment and the machining characteristic according to the conventional technology. In FIG. 4, the vertical axis represents the machining depth (mm) and the horizontal axis represents the time (min). Moreover, a characteristic curve 39a indicates the machining performance according to the first embodiment and a characteristic curve 39b indicates the machining performance according to the conventional technology.

In FIG. 4 is illustrated the machining characteristic when electrical discharge machining is performed with the machining depth of 50 mm. The machining electrode is a graphite rib and the thickness of the tip is 1 mm and the overlap of 10 mm. The machining object is made of steel. The liquid processing is jet-less. The machining conditions include the peak current value of 40 A, the pulse width of 200 μs, the quiescent period of 500 μs, the jump-up distance of 8.0 mm, and the jump-down time of 250 ms.

In the machining performance 39a according to the first embodiment, it was found that the machining time is almost identical to the machining time in the machining performance 39b according to the conventional technology, but reduction in the electrode wear and reduction in the occurrence of granular projections (adhesion of carbide) can be achieved.

As described above, according to the first embodiment, cutoff control of the discharge pulse width is performed not on the basis of the detection of the high-frequency component but on the basis of the magnitude relation between the discharge voltage level and the reference voltage Vc. Therefore, even if there is occurrence of abnormal electrical discharge by which the discharge voltage drops along the way, the discharge pulse width can be cut off with precision and can be controlled at an optimal level in the normal electrical discharge period.

Moreover, since the quiescent period is controlled on the basis of the magnitude relation between the high-frequency component and the voltage reference Vref and the magnitude relation between the discharge voltage level and the reference voltage Vc, it becomes possible to accurately identify a normal discharge pulse or an abnormal discharge pulse and perform setting control of an appropriate quiescent period. That makes it possible to curb the occurrence of abnormal electrical discharge in the machining gap and prevent damage to the machining electrode or the machining object. Moreover, the occurrence of granular projections (adhesion of carbide) can also be prevented.

Furthermore, in the first embodiment, the explanation is given for controlling the quiescent period at the time of occurrence of abnormal electrical discharge. Along with that, it is also possible to control the machining conditions such as the jump-down time or the jump-up distance. In this case, simply put, a function for controlling the machining conditions such as the jump-down time or the jump-up distance can be added to the quiescent pulse control device 26.

In the first embodiment, the explanation is given for controlling the quiescent period at the time of occurrence of abnormal electrical discharge. Along with that, or in place of the quiescent period control, it is also possible to perform thinning-out control of the discharge pulse. In the case of performing the thinning-out control of the discharge pulse along with the quiescent period control, it is desirable to connect an input device for inputting the number of discharge pulses to be thinned-out to the discharge pulse control device 22 so that the number of discharge pulses to be thinned-out is changeable.

Consider the case of performing the thinning-out control of the discharge pulse in place of the quiescent period control. With reference to the configuration illustrated in FIG. 1, when the discharge pulse diagnosis device 23 determines an abnormal discharge pulse, the quiescent pulse control device 26 can be configured to notify the number of discharge pulses to be thinned-out to the discharge pulse control device 22 instead of outputting the quiescent pulse. That is, the quiescent pulse control device 26 can be referred to as a thin-out number deciding unit.

Second Embodiment

Figure 5:
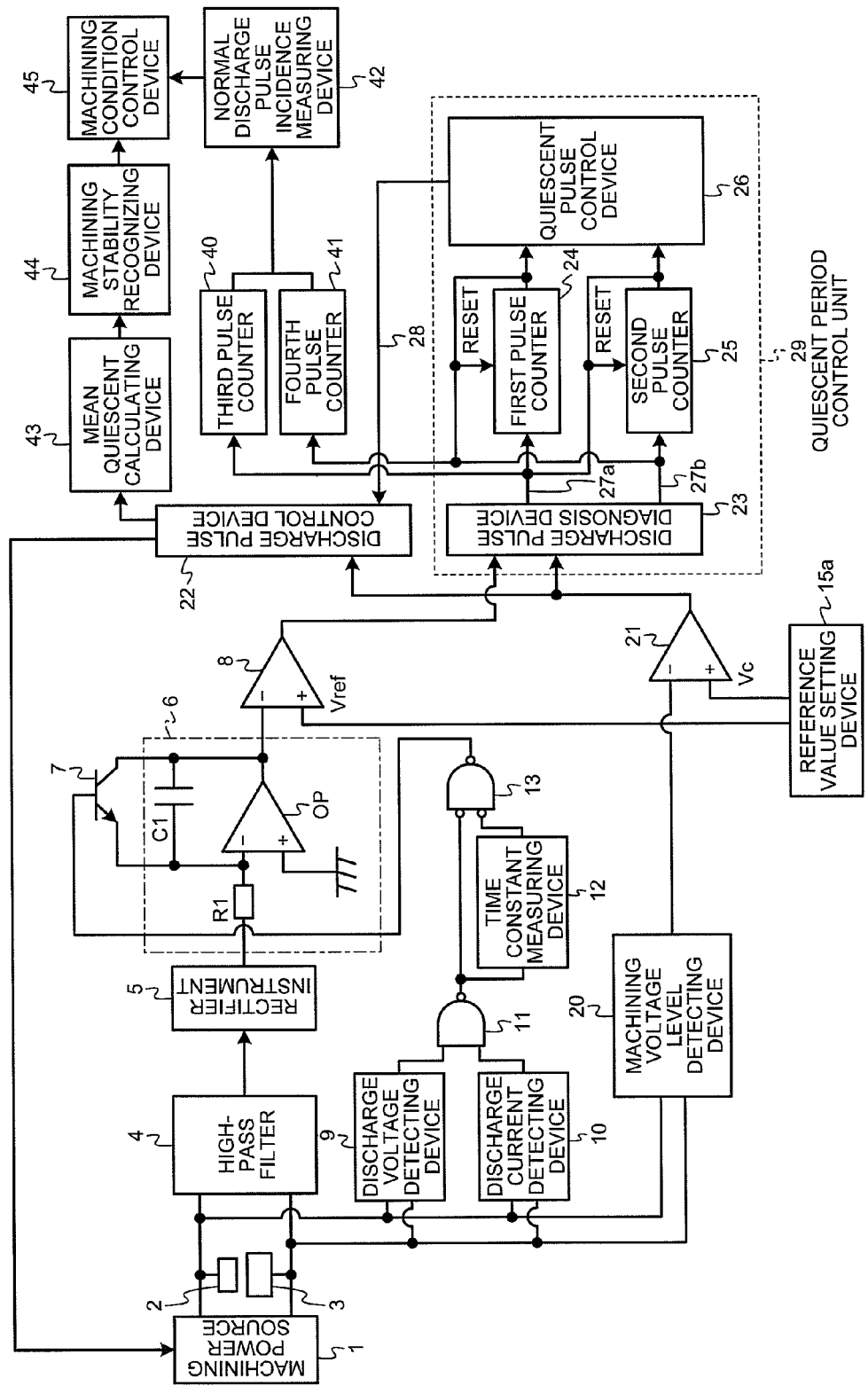
FIG. 5 is a block diagram illustrating a configuration of a power source controller of an electrical discharge machine according to a second embodiment of the present embodiment.

FIG. 5 is a block diagram illustrating a configuration of a power source controller of an electrical discharge machine according to a second embodiment of the present embodiment. In FIG. 5, components identical or equivalent to those illustrated in FIG. 1 (according to the first embodiment) are referred to by the same reference numerals. In the following description, the focus is on the portion related to the second embodiment.

As illustrated in FIG. 5, the power source controller of an electrical discharge machine according to the second embodiment includes, in addition to the configuration illustrated in FIG. 1 (according to the first embodiment), a third pulse counter 40 that is a normal discharge pulse counter, a fourth pulse counter 41 that is an abnormal discharge pulse counter, a normal discharge pulse incidence measuring device 42, a mean quiescent calculating device 43, a machining stability recognizing device 44, and a machining condition control device 45.

The third pulse counter 40 counts the normality determination pulse 27a output by the discharge pulse diagnosis device 23. The fourth pulse counter 41 counts the fault determination pulse 27b output by the discharge pulse diagnosis device 23.

The normal discharge pulse incidence measuring device 42 measures the normal discharge pulse incidence by making use of the count value of the normality determination pulse 27a counted for a predetermined period (e.g., 500 μs) by the third pulse counter 40 and the count value of the fault determination pulse 27b counted for a predetermined period (e.g., 500 μs) by the fourth pulse counter 41 and performing calculation as follows: (count value of normality determination pulse 27a)/(count value of normality determination pulse 27a+count value of fault determination pulse 27b).

The mean quiescent calculating device 43 calculates the mean value within a predetermined period (e.g., 500 μs) of the quiescent period, which is subjected to change control by the quiescent period control unit 29 by following the sequence illustrated in FIG. 3. As can be understood from the explanation with reference to FIG. 3, the calculated mean quiescent period changes to different extents according to the mode of occurrence of abnormal electrical discharge.

As explained with reference to FIG. 3, in an electrical discharge state in which the fault determination pulse 27b is output in succession for a predetermined number of times by the discharge pulse diagnosis device 23, the quiescent period is lengthened for curbing the occurrence of abnormal electrical discharge. Thus, it can be considered that the electrical discharge state moves into stability.

The machining stability recognizing device 44 recognizes "stability" or "instability" of the machining state from the extent or elongation of the mean quiescent period calculated by the mean quiescent calculating device 43. For example, the machining stability recognizing device 44 recognizes "stability" when the mean quiescent period exceeds 1.6 times of the unit quiescent period Toff and recognizes "instability" when the mean quiescent period is smaller than 1.6 times of the unit quiescent period Toff. Meanwhile, "1.6 times" is an empirically set value and is irrelevant to the value N explained with reference to FIG. 3.

Figure 6:
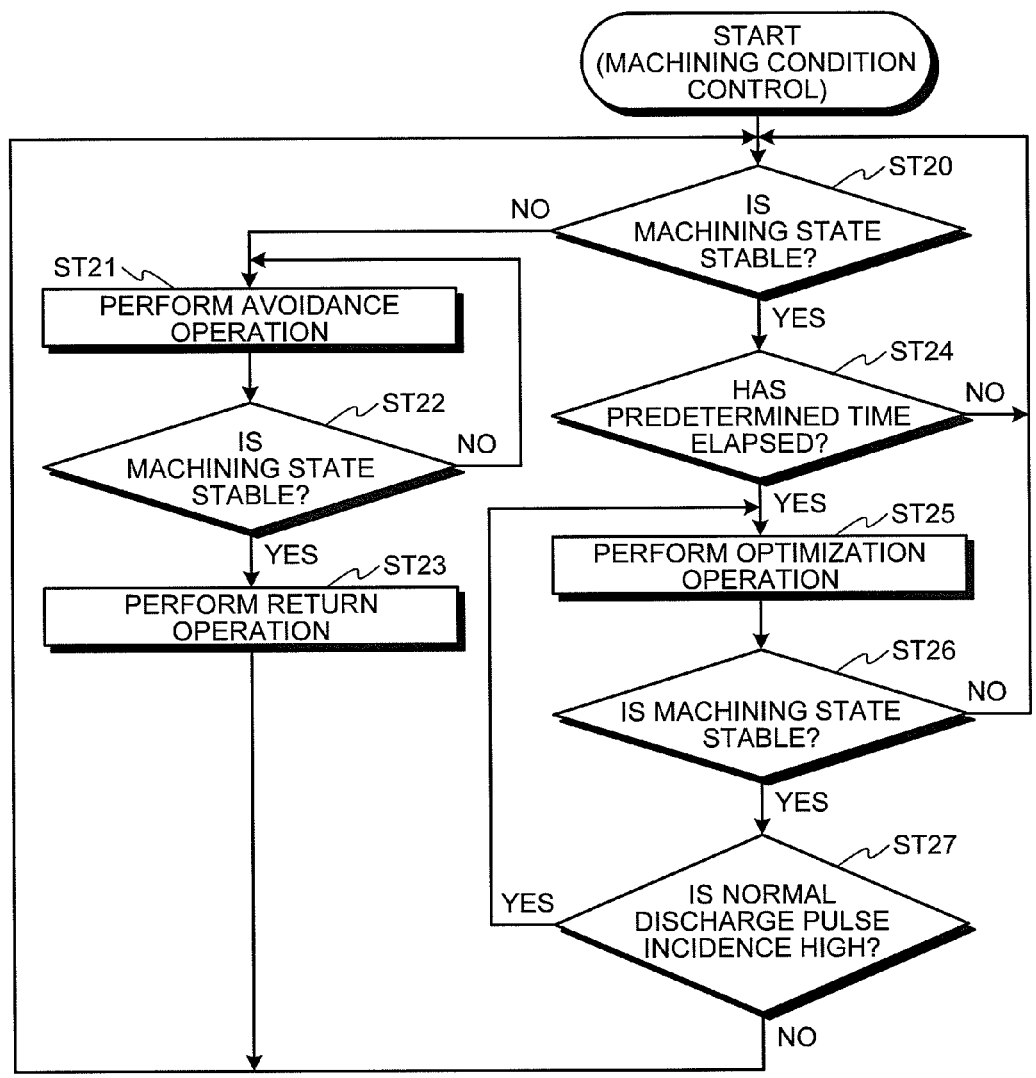
FIG. 6 is a flowchart explaining the operations performed by a machining condition control device illustrated in FIG. 5.

The machining condition control device 45 controls switching of the machining conditions (quiescent period, jump-down time, jump-up distance, etc.) by following a sequence described, for example, with reference to FIG. 6 on the basis of the recognition result regarding "stability" or "instability" of the machining stability recognizing device 44 and the normal discharge pulse incidence measured by the normal discharge pulse incidence measuring device 42. Although not illustrated, the machining condition control device 45 sends the controlled quiescent period to the discharge pulse control device 22. Moreover, the machining condition control device 45 sends the controlled jump-down time or the controlled jump-up distance to a machining gap control unit (not illustrated) that controls movement of the machining electrode 2. The detailed explanation is given below with reference to FIG. 6.

FIG. 6 is a flowchart explaining the operations performed by the machining condition control device illustrated in FIG. 5. With reference to FIG. 6, firstly, it is determined whether the machining stability recognizing device 44 has recognized the machining state to be "stable" (ST20). If the machining stability recognizing device 44 has recognized the machining state to be "unstable" (No at ST20), then an avoidance operation is performed so that the set machining conditions (e.g., the quiescent period set in the discharge pulse control device 22) are largely changed (in this example, by largely increasing the quiescent period) (ST21). The recognition status of the machining stability recognizing device 44 is monitored for a change (ST22).

If the result of monitoring at ST22 indicates that the machining stability recognizing device 44 is still recognizing the machining state to be "unstable" (No at ST22), the avoidance operation (ST21) is repeated. Subsequently, when the machining stability recognizing device 44 recognizes the machining state to be "stable" (Yes at ST22), a return operation is performed so that the machining conditions return to the pre-avoidance-operation state prior to ST21 (in this example, pre-avoidance-operation quiescent period) (ST23). Then, the system control returns to ST20 for determining whether the machining stability recognizing device 44 has recognized the machining state to be "stable".

If the machining stability recognizing device 44 has recognized the machining state to be "stable" (Yes at ST20), then it is monitored whether that state continues for a predetermined period (e.g., 400 times of cycling time of 0.25 seconds) (ST24). If the state in which the machining stability recognizing device 44 recognizes the machining state to be "stable" (Yes at ST20) continues for a predetermined period (Yes at ST24), then an optimization operation is performed with respect to the quiescent period set in the discharge pulse control device 22 and the jump-down time or the jump-up distance set in the machining gap control unit (not illustrated) that controls movement of the machining electrode 2 so that the machining efficiency improves (ST25). For example, the optimization operation is performed with respect to the jump-down time (Jd=Jd−1 notch), the jump-up distance (Ju=Ju−1 notch), and the quiescent period (OFF=OFF−1 notch) in that order.

Subsequently, it is again determined whether the machining stability recognizing device 44 has recognized the machining state to be "stable" (ST26) and if the machining stability recognizing device 44 has recognized the machining state to be "unstable" (No at ST26), then the system control returns to ST20 and the machining condition control is started afresh.

Conversely, if the machining stability recognizing device 44 has recognized the machining state to be "stable" (Yes at ST26), then it is determined whether the normal discharge pulse incidence is high when calculated in a period (e.g., 30 seconds) set after a change in the machining conditions (ST27). If the normal discharge pulse incidence is high at, for example, 80% or more (Yes at ST27), then it is determined that the optimization operation has yielded a favorable result. The system control then returns to ST25 for continually performing the optimization operation. If the normal discharge pulse incidence is low (No at ST27), then the system control returns to ST20 and the machining condition control is started afresh. This is the manner in which the machining condition control is performed.

Figure 7:
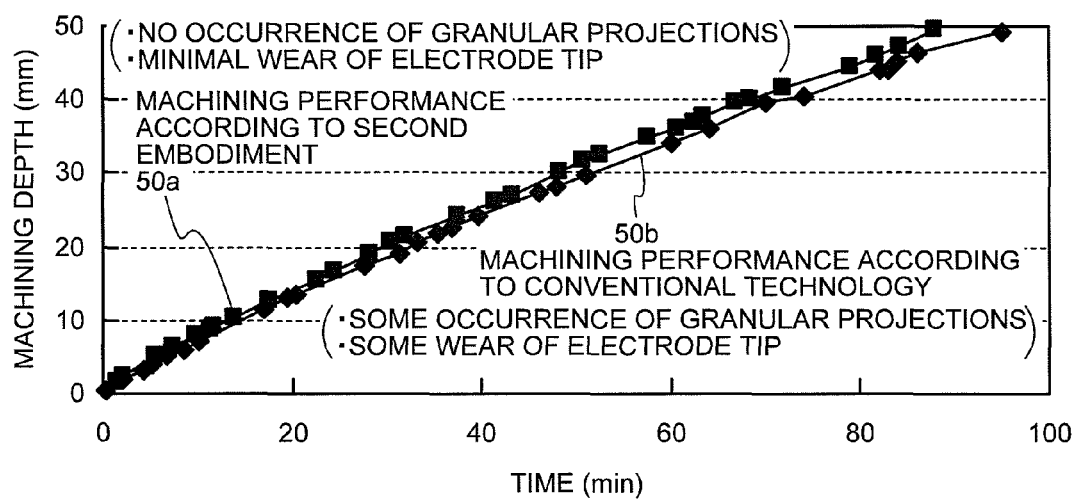
FIG. 7 is a machining characteristic diagram illustrating a comparison between the machining characteristic according to the second embodiment and the machining characteristic according to the conventional technology.

FIG. 7 is a machining characteristic diagram illustrating a comparison between the machining characteristic according to the second embodiment and the machining characteristic according to the conventional technology. In FIG. 7, the vertical axis represents the machining depth (mm) and the horizontal axis represents the time (min). Moreover, a characteristic curve 50a indicates the machining performance according to the second embodiment and a characteristic curve 50b indicates the machining performance according to the conventional technology.

In FIG. 7 is illustrated the machining characteristic when machining is performed with the machining depth of 50 mm. The machining electrode is a graphite rib and the thickness of the tip is 1 mm and the overlap of 10 mm. The machining object is made of steel. The liquid processing is jet-less. The machining conditions include the peak current value of 45 A, the pulse width of 200 μs, the quiescent period of 500 μs, the jump-up distance of 8.0 mm, and the jump-down time of 250 ms.

In the machining performance 50a according to the second embodiment, it was found that the machining time becomes shorter than the machining time in the conventional technology and that reduction in the electrode wear and reduction in the occurrence of granular projections (adhesion of carbide) can be achieved.

In this way, according to the second embodiment, the machining conditions are changed to enable an increase in the normal discharge pulse incidence. That makes it possible to perform optimal control of the machining conditions such as the quiescent period, the jump-down time, and the jump-up distance. As a result, it becomes possible to perform electrical discharge machining at the maximum machining speed while reducing the electrode wear as well as reducing the occurrence of granular projections (adhesion of carbide).

Meanwhile, although, in the second embodiment, the description is given for the case of changing the machining conditions to enable an increase in the normal discharge pulse incidence, the machining conditions can also be changed to enable an increase in the number of normal discharge pulses. In that case, with reference to FIG. 5, the fourth pulse counter 41 and the normal discharge pulse incidence measuring device 42 can be removed and the count value of the third pulse counter 40 can be directly sent to the machining condition control device 45.

Third Embodiment

Figure 8:
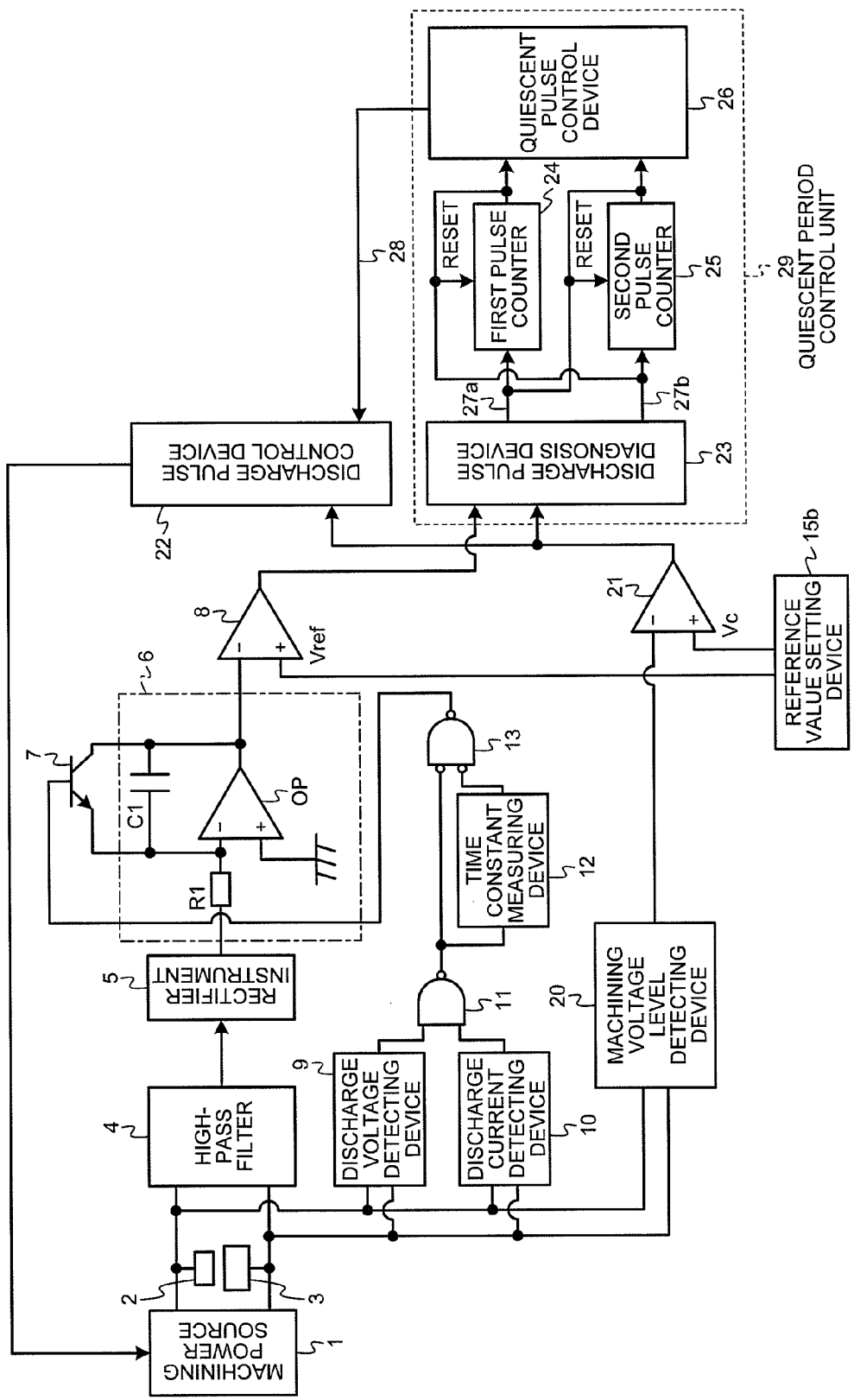
FIG. 8 is a block diagram illustrating a configuration of a power source controller of an electrical discharge machine according to a third embodiment of the present embodiment.

FIG. 8 is a block diagram illustrating a configuration of a power source controller of an electrical discharge machine according to a third embodiment of the present embodiment. In FIG. 8, components identical or equivalent to those illustrated in FIG. 1 (according to the first embodiment) are referred to by the same reference numerals. In the following description, the focus is on the portion related to the third embodiment.

As illustrated in FIG. 8, the power source controller of an electrical discharge machine according to the third embodiment includes a reference value setting device 15b in place of the reference value setting device 15a in the configuration illustrated in FIG. 1 (according to the first embodiment).

The reference value setting device 15b supplies a reference voltage Vref' to the high-frequency component comparator 8 and supplies a reference voltage Vc' to the voltage level comparator 21. The reference voltage Vref' and the reference voltage Vc' are reference voltages selected according to the material of the machining electrode 2 and the machining object 3 that form the machining gap.

The reference value setting device 15b is configured in such a way that the reference voltage Vref' and the reference voltage Vc' can be selected and input manually according to the material of the machining electrode 2 and the machining object 3. Alternatively, the reference value setting device 15b is configured to include a relation table for the relation between the materials of the machining electrode 2 and the machining object 3 with the respective reference voltages Vref' and the respective reference voltages Vc'. Then, upon receiving an input of the material of the machining electrode 2 and the machining object 3 forming the machining gap, the reference value setting device 15b reads the corresponding reference voltage Vref' and the corresponding reference voltage Vc' from the relation table.

In this configuration, the high-frequency component that is superimposed on the voltage at the time of electrical discharge occurring in the machining gap is compared with the reference voltage Vref'. If the high-frequency component is larger than the reference voltage Vref', then normal electrical discharge is determined to have occurred. If the high-frequency component is smaller than the reference voltage Vref', then abnormal electrical discharge is determined to have occurred. Similarly, the voltage level in the machining gap is compared with the reference voltage Vc'. If the voltage level is larger than the reference voltage Vc', then normal electrical discharge is determined to have occurred. If the voltage level is smaller than the reference voltage Vc', then abnormal electrical discharge is determined to have occurred.

At the time of abnormal electrical discharge, the discharge pulse width and the quiescent period are controlled in a sequence identical to that described in the first embodiment.

While controlling the quiescent period, the operation details can be changed by varying the constants M, L, and N illustrated in FIG. 3 corresponding to the reference voltage Vref' and the reference voltage Vc'. Moreover, the thinning-out control of the discharge pulse can also be performed in an identical manner to that described in the first embodiment.

Figure 9:
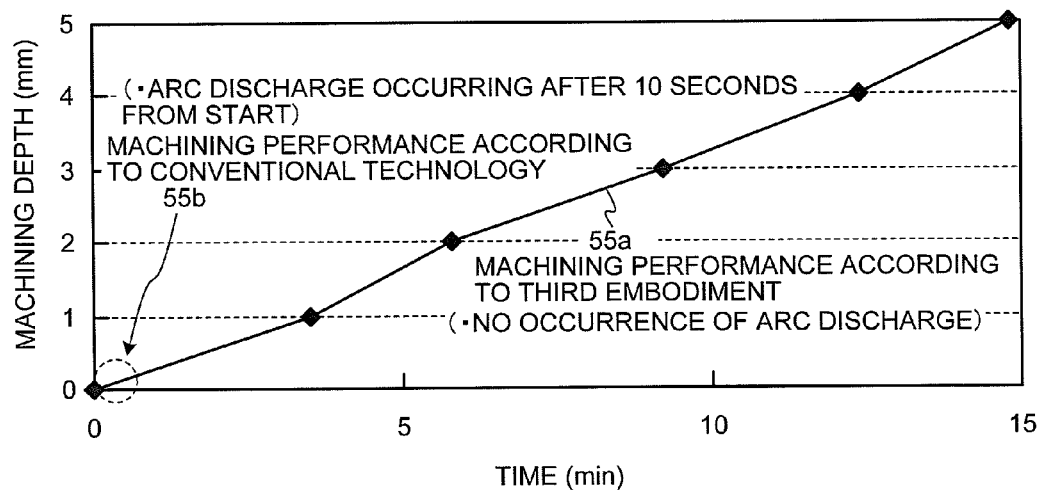
FIG. 9 is a machining characteristic diagram illustrating a comparison between the machining characteristic according to the third embodiment and the machining characteristic according to the conventional technology.

FIG. 9 is a machining characteristic diagram illustrating a comparison between the machining characteristic according to the third embodiment and the machining characteristic according to the conventional technology. In FIG. 9, the vertical axis represents the machining depth (mm) and the horizontal axis represents the time (min). Moreover, a characteristic curve 55a indicates the machining performance according to the third embodiment and a characteristic curve 55b indicates the machining performance according to the conventional technology.

In FIG. 9 is illustrated the machining characteristic when machining is performed with the machining depth of 50 mm. The machining electrode is a graphite electrode having a 10 mm square tip. The machining object is made of steel alloy. The liquid processing is jet-less. The machining conditions include the peak current value of 25 A, the pulse width of 200 μs, the quiescent period of 100 μs, the jump-up distance of 1.4 mm, and the jump-down time of 500 ms.

In the machining performance 55b according to the conventional technology, arc discharge (abnormal electrical discharge) was found to have occurred after 10 seconds from the start. In contrast, in the machining performance 55a according to the third embodiment, the occurrence of abnormal electrical discharge was not found and it was possible to perform stable machining.

In this way, according to the third embodiment, the reference voltage for comparison with the high-frequency component and the reference voltage for comparison with the discharge voltage level are selected according to the material of the machining electrode and the machining object. Hence, even if the machining electrode and the machining object are made of a special material, it is possible to perform stable machining while preventing the occurrence of abnormal electrical discharge.

Meanwhile, the third embodiment is given as an example of the application of the first embodiment. In an identical manner, in the second embodiment too, the reference value setting device 15b can be disposed in place of the reference value setting device 15a.

INDUSTRIAL APPLICABILITY

As described above, the power source controller of an electrical discharge machine according to the present invention is suitable in detecting the electrical discharge state with precision and suitable in optimally controlling the discharge pulse width and the quiescent period even if the discharge voltage decreases due to the occurrence of abnormal electrical discharge so that occurrence of abnormal electrical discharge and electrode wear is reduced and occurrence of granular projections (adhesion of carbide) is prevented, and is particularly suitable as the power source controller of a die-sinking electrical discharge machine.

The invention claimed is:

1. A power source controller of an electrical discharge machine for controlling a discharge pulse width and a quiescent period of a pulse discharge produced in a machining gap of the electrical discharge machine, comprising:

a high-frequency component detecting unit that detects a high-frequency component superimposed on a discharge voltage at time of electrical discharge occurring in the machining gap;

a voltage level detecting unit that detects a voltage level of the discharge voltage;

a high-frequency component comparator that compares a magnitude relation between the high-frequency component detected by the high-frequency component detecting unit and a high-frequency component reference value;

a voltage level comparator that compares a magnitude relation between the voltage level detected by the voltage level detecting unit and a voltage level reference value;

a quiescent period control unit that, when abnormal electrical discharge is detected, outputs, based on a comparison result of the high-frequency component comparator and a comparison result of the voltage level comparator, a quiescent pulse that indicates an appropriate change in length of the quiescent period according to mode of occurrence of the abnormal electrical discharge, and a discharge pulse control unit that, when a comparison result of the voltage level comparator indicates the abnormal electrical discharge, reduces the discharge pulse width by cutting off application of voltage to the machining gap and subsequently performs change control of the quiescent period, which lasts until application of voltage to the machining gap, according to a quiescent period indicated by the quiescent pulse.

2. The power source controller of the electrical discharge machine according to claim 1, wherein, when normal electrical discharge is subsequently detected, the quiescent period control unit outputs a quiescent pulse that indicates changing a lengthened quiescent period to a length for an appropriate discharge pulse width.

3. The power source controller of the electrical discharge machine according to claim 1, wherein the quiescent period control unit comprises a discharge pulse diagnosis unit that performs diagnosis of a discharge pulse produced in the machining gap based on a comparison result of the high-frequency component comparator and a comparison result of the voltage level comparator;

a first pulse counter that counts a first predetermined number of times for which the discharge pulse diagnosis unit determines a normal discharge pulse in succession;

a second pulse counter that counts a second predetermined number of times for which the discharge pulse diagnosis unit determines an abnormal discharge pulse in succession; and a quiescent pulse control unit that generates and outputs the quiescent pulse that indicates a quiescent period determined based on whether each of the first pulse counter and the second pulse counter has counted for corresponding predetermined number of times.

4. The power source controller of the electrical discharge machine according to claim 1, further comprising a reference value setting unit that sets the high-frequency component reference value and the voltage level reference value according to material of a machining electrode and a machining object that form the machining gap.

5. The power source controller of the electrical discharge machine according to claim 1, wherein, when performing quiescent period control, the quiescent period control unit also controls machining conditions including jump-down time and jump-up distance.

6. The power source controller of the electrical discharge machine according to claim 1, further comprising an input device that is used for inputting number of discharge pulses to be thinned-out to the discharge pulse control unit.

7. The power source controller of the electrical discharge machine according to claim 1, further comprising:
- a mean quiescent calculating unit that calculates a mean value of quiescent period subjected to change control by the quiescent period control unit;
- a machining stability recognizing unit that recognizes an electrical discharge machining state using length of mean quiescent period calculated by the mean quiescent calculating unit as an index for stability/instability;
- a normal discharge pulse counter that counts a number of times for which the quiescent period control unit determines a normal discharge pulse;
- an abnormal discharge pulse counter that counts a number of times for which the quiescent period control unit determines an abnormal discharge pulse;
- a normal discharge pulse incidence measuring unit that measures normal discharge pulse incidence based on a count value of the normal discharge pulse counter and a count value of the abnormal discharge pulse counter; and
- a machining condition control unit that refers to recognition state of the machining stability recognizing unit and switches a machining condition in such a way that the normal discharge pulse incidence increases.

8. The power source controller of the electrical discharge machine according to claim 1, further comprising:
- a mean quiescent calculating unit that calculates a mean value of quiescent period subjected to change control by the quiescent period control unit;
- a machining stability recognizing unit that recognizes an electrical discharge machining state using length of mean quiescent period calculated by the mean quiescent calculating unit as an index for stability/instability;
- a normal discharge pulse counter that counts a number of times for which the quiescent period control unit determines a normal discharge pulse; and
- a machining condition control unit that refers to recognition state of the machining stability recognizing unit and switches a machining condition in such a way that the normal discharge pulse incidence increases.

9. A power source controller of an electrical discharge machine for controlling a discharge pulse width and a quiescent period of a pulse discharge produced in a machining gap of the electrical discharge machine, comprising:
- a high-frequency component detecting unit that detects a high-frequency component superimposed on a discharge voltage at time of electrical discharge occurring in the machining gap;
- a voltage level detecting unit that detects a voltage level of the discharge voltage;
- a high-frequency component comparator that compares a magnitude relation between the high-frequency component detected by the high-frequency component detecting unit and a high-frequency component reference value;
- a voltage level comparator that compares a magnitude relation between the voltage level detected by the voltage level detecting unit and a voltage level reference value; and
- a thin-out number control unit that, when abnormal electrical discharge is detected, indicates, based on a comparison result of the high-frequency component comparator and a comparison result of the voltage level comparator, an appropriate change in number of discharge pulses to be thinned-out produced in the machining gap according to mode of occurrence of the abnormal electrical discharge, and
- is charge pulse control unit ha when a comparison result of the voltage level comparator indicates the abnormal electrical discharge, reduces the discharge pulse width by cutting off application of voltage to the machining gap and subsequently performs change control of the number of discharge pulses generated in the machining gap according to the thin-out number indicated by the thin-out number control unit.

10. The power source controller of the electrical discharge machine according to claim 9, wherein, when normal electrical discharge is subsequently detected, the thin-out number control unit indicates changing the increased thin-out number to a number for an appropriate discharge pulse width.

11. The power source controller of the electrical discharge machine according to claim 9, wherein the thin-out number control unit comprises
- a discharge pulse diagnosis unit that performs diagnosis of a discharge pulse produced in the machining gap based on a comparison result of the high-frequency component comparator and a comparison result of the voltage level comparator;
- a first pulse counter that counts a first predetermined number of times for which the discharge pulse diagnosis unit determines a normal discharge pulse in succession;
- a second pulse counter that counts a second predetermined number of times for which the discharge pulse diagnosis unit determines an abnormal discharge pulse in succession; and
- a thin-out number deciding unit that generates and outputs the thin-out number based on whether each of the first pulse counter and the second pulse counter has counted for corresponding predetermined number of times.

12. The power source controller of the electrical discharge machine according to claim 9, further comprising a reference value setting unit that sets the high-frequency component reference value and the voltage level reference value according to material of a machining electrode and a machining object that form the machining gap.

* * * * *